(12) United States Patent  
Weber

(10) Patent No.: US 9,224,364 B2  
(45) Date of Patent: Dec. 29, 2015

(54) APPARATUS AND METHOD FOR INTERACTING WITH HANDHELD CARRIER HOSTING MEDIA CONTENT

(71) Applicant: Apple Inc., Cupertino, CA (US)

(72) Inventor: Douglas Weber, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 108 days.

(21) Appl. No.: 13/858,868

(22) Filed: Apr. 8, 2013

(65) Prior Publication Data

US 2013/0293492 A1    Nov. 7, 2013

Related U.S. Application Data

(62) Division of application No. 12/686,294, filed on Jan. 12, 2010, now Pat. No. 8,417,779.

(51) Int. Cl.
| | |
|---|---|
| *G06F 15/16* | (2006.01) |
| *G09G 5/12* | (2006.01) |
| *H04W 4/00* | (2009.01) |
| *H04W 4/02* | (2009.01) |

(52) U.S. Cl.
CPC .................. *G09G 5/12* (2013.01); *H04W 4/003* (2013.01); *H04W 4/023* (2013.01)

(58) Field of Classification Search
CPC ................................. H04W 4/003; G09G 5/12
USPC ......................................................... 709/204
See application file for complete search history.

(56) References Cited

U.S. PATENT DOCUMENTS

| 8,219,936 B2 | 7/2012 | Kim et al. | |
| 2002/0174269 A1 | 11/2002 | Spurgat et al. | |
| 2004/0039797 A1 | 2/2004 | Simpson et al. | |
| 2004/0076342 A1* | 4/2004 | Wolff et al. .................... | 382/294 |
| 2005/0076295 A1* | 4/2005 | Simske et al. ................ | 715/517 |
| 2005/0228683 A1 | 10/2005 | Saylor et al. | |
| 2006/0041590 A1 | 2/2006 | King et al. | |
| 2006/0107330 A1 | 5/2006 | Ben-Yaacov et al. | |
| 2006/0119900 A1 | 6/2006 | King et al. | |
| 2006/0161870 A1 | 7/2006 | Hotelling et al. | |
| 2007/0198426 A1 | 8/2007 | Yates | |
| 2007/0266410 A1 | 11/2007 | Balfanz et al. | |
| 2008/0165259 A1 | 7/2008 | Nobels | |
| 2008/0195735 A1* | 8/2008 | Hodges et al. ................ | 709/227 |
| 2008/0205354 A1 | 8/2008 | Makela et al. | |
| 2011/0081923 A1* | 4/2011 | Forutanpour et al. ......... | 455/457 |

* cited by examiner

*Primary Examiner* — David X Yi

(74) *Attorney, Agent, or Firm* — Downey Brand LLP

(57) ABSTRACT

Improved techniques for interacting with one or more handheld carriers hosting media content are disclosed. The handheld carrier hosting media content may be sensed, and at least a portion of the media content may be integrated into operation of a media activity provided by a computing device, upon recognizing the media activity and the media content. The media activity provided by the computing device may involve creating or editing an electronic document. The integration of the media content into operation of the media activity may involve insertion or importation of the media content into the electronic document.

20 Claims, 10 Drawing Sheets

APPARATUS AND METHOD FOR INTERACTING WITH HANDHELD CARRIER HOSTING MEDIA CONTENT

CROSS REFERENCE TO RELATED APPLICATIONS

This application is a divisional of and claims priority to U.S. application Ser. No. 12/686,294, filed Jan. 12, 2010, entitled "APPARATUS AND METHOD FOR INTERACTING WITH HANDHELD CARRIER HOSTING MEDIA CONTENT", the disclosure of which is hereby incorporated by reference in its entirety for all purposes.

BACKGROUND OF THE INVENTION

1. Field of the Invention

The present invention relates to interacting with media content and, more particularly, to interacting with portable or transportable media content.

2. Description of the Related Art

Powered by recent advances in digital media technology, there is a rapid increase in variety of different ways of interacting with digital media content, such as images (e.g., photos), text, audio items (e.g., audio files, including music or songs), or videos (e.g., movies). In the past, consumers were constrained to interacting with digital media content on their desktop or in their living room in their home. Today, portability lets people enjoy digital media content at any time and in any place. Further, today e-mail may be sent from anywhere, to anywhere.

While such portability of media content provides some advantages, some challenges still remain. Interacting with portable media content may be limited; or may require too many manual steps for users; or may not always be intuitive, easy or convenient for users.

Thus, there is a need for improved techniques for interacting with media content.

SUMMARY

Broadly speaking, the invention pertains to improved techniques for interacting with one or more handheld carriers hosting media content. The handheld carrier hosting media content may be sensed, and at least a portion of the media content may be integrated into operation of a media activity, upon recognizing the media activity and the media content.

The invention can be implemented in numerous ways, including as a method, system, device, apparatus (including graphical user interface), or computer readable medium. Several embodiments of the invention are discussed below.

As a computer implemented method for transferring content, another embodiment includes at least the acts of: detecting proximity of a first device relative to a second device; recognizing a desire to transfer content from the first device to the second device at least in part based on proximity of the two devices; and transferring the content from the first device to the second device.

As a computer-implemented method for interacting with a handheld carrier hosting media content, one embodiment includes at least the acts of controlling operation of an activity window through a user interface coupled with a non-handheld base unit, the activity window being presented on a display device associated with the non-handheld base unit; requesting a media activity for the activity window; receiving media content from the handheld carrier to participate in the media activity; and integrating the media content from the handheld carrier into the activity window presented on the display device associated with the non-handheld base unit.

As a computer readable medium including at least computer program code for interacting with a handheld carrier hosting media content, one embodiment includes at least: computer program code for controlling operation of a media activity through a user interface coupled with a non-handheld base unit; computer program code for sensing the media content of the handheld carrier; computer program code for sensing the media activity; and computer program code for integrating at least a portion of the media content into the operation of the media activity, upon recognizing the media activity and the media content.

As an apparatus for interacting with a handheld carrier hosting media content, one embodiment includes at least a non-handheld base computing unit configured to support a media activity, a user interface enabling a user to control operation of the media activity being supported by the non-handheld base computing unit, at least one sensor, and control logic. The control logic can be configured to integrate at least a portion of the media content from the handheld carrier into the operation of the media activity upon recognizing the media activity and the media content.

As an apparatus for interacting with a handheld carrier hosting media content, another embodiment includes at least one or more sensors, and a media application framework for controlling a plurality of media activities. The media application framework can be coupled with the one or more of sensors for integrating at least a portion of the media content from the handheld carrier into the operation of at least one of the plurality of media activities, upon recognizing the media content and at least one of the media activities.

As a computer readable medium including at least computer program code stored thereon for receiving a wireless content transfer, one embodiment can, for example, include at least: computer program code for presenting an electronic document on a display device associated with a recipient computing device that is to receive a wireless content transfer; computer program code for detecting that an handheld electronic device is proximate to the display device associated with the recipient computing device; computer program code for activating direct wireless transfer of identified content from the handheld electronic device to the recipient computing device if the handheld electronic device is detected as being proximate to the display device associated with the recipient computing device; and computer program code for importing the identified content that has been transferred into the electronic document being presented on the display device associated with the recipient computing device.

As a computer readable medium including at least computer program code stored thereon for receiving a hand-drawn diagram into an electronic document, one embodiment can, for example, include at least: computer program code for presenting an electronic document on a display device associated with a recipient computing device that is to receive the hand-drawn diagram; computer program code for determining whether a request to insert the hand-drawn diagram into the electronic document has been received; computer program code for activating a camera associated with the recipient computing device if it is determined that the request to insert the hand-drawn diagram into the electronic document has been received; computer program code for electronically capturing an image of the hand-drawn diagram using the camera associated with the recipient computing device; computer program code for automatically formatting the image; and computer program code for inserting the image into the electronic document being presented on the display device associated with the recipient computing device.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF EMBODIMENTS OF THE INVENTION

The invention pertains to improved techniques for interacting with one or more handheld carriers hosting media content. A handheld carrier hosting media content may be sensed, and at least a portion of the media content may be integrated into operation of a media activity provided by a computing device, upon recognizing the media activity and the media content. The media activity provided by the computing device may involve creating or editing an electronic document. The integration of the media content into operation of the media activity may involve insertion or importation of the media content into the electronic document.

The media content can be digital media content, such as images (e.g., photos), text, audio items (e.g., audio files, including music or songs), or videos (e.g., movies). The handheld carrier can, for example, be a handheld multifunction electronic device capable of presenting (e.g., playing or displaying) one or more of images, text, audio items, and videos. Alternatively, the handheld carrier can, for example, be a physical document (e.g., paper product) having a surface depicting physical media content.

The invention can be implemented in various different embodiments. According to one embodiment, an electronic image resident on a portable electronic device can be transferred and inserted into an existing electronic document in use on a computing device. According to another embodiment, a hand-drawn diagram can be inserted into an existing electronic document in use on a computing device.

Embodiments of the invention are discussed below with reference to FIGS. 1-10. However, those skilled in the art will readily appreciate that the detailed description given herein with respect to these figures is for explanatory purposes as the invention extends beyond these limited embodiments.

Figure 1:
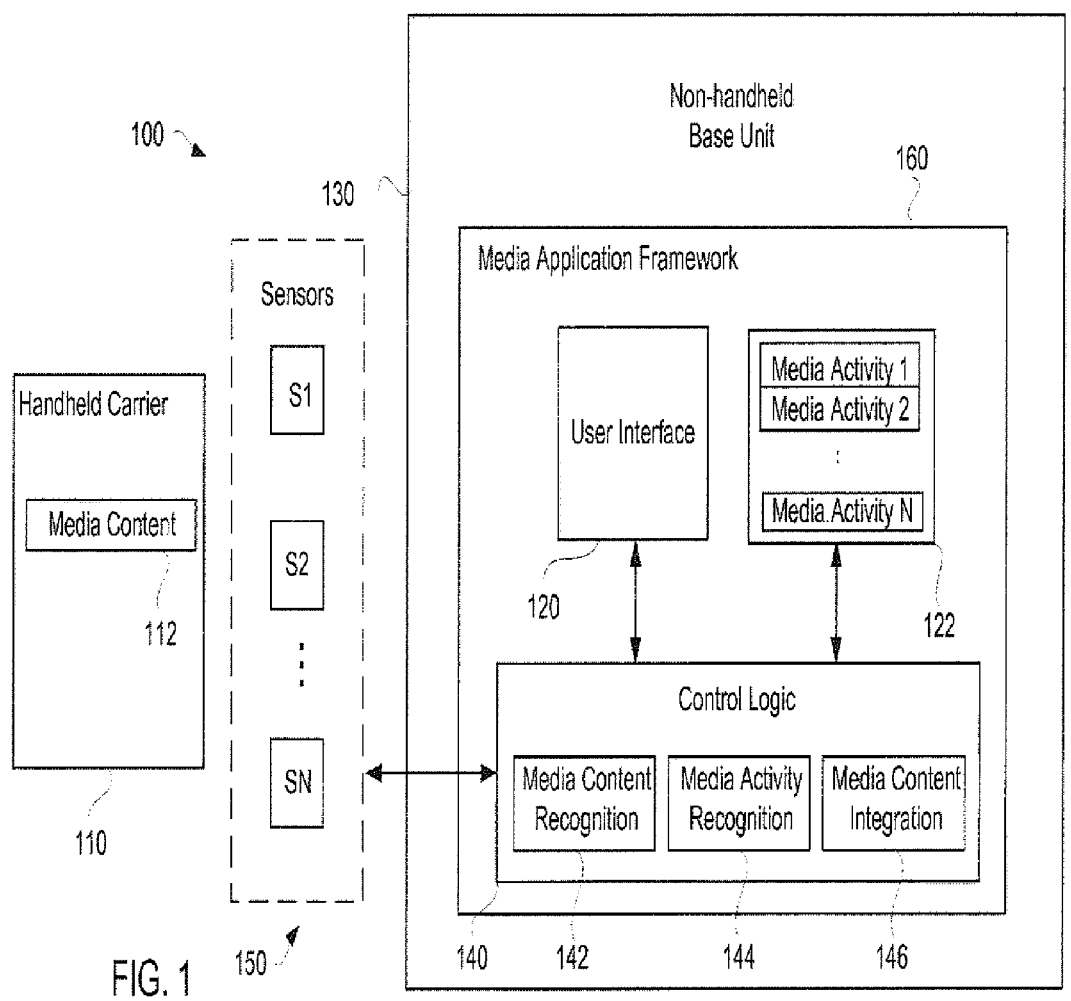
FIG. 1 is a block diagram of a system for interacting with a handheld carrier hosting media content, according to one embodiment.

FIG. 1 is a block diagram of a system 100 for interacting with a handheld carrier 110 hosting media content 112, according to one embodiment. The system 100 can also include a non-handheld base unit 130 and one or more sensors 150. The non-handheld base unit can interact with the handheld carrier 110, typically in a wireless manner. The non-handheld base unit 130 can include a media application framework 160. The media application framework 160 may be employed for providing media application services and/or functionality to a plurality of media activities 122. The media application framework 160 may control the plurality of media activities 122.

A user interface 120 may be provided by the non-handheld base unit 130 for controlling operation of one or more of a plurality of media activities 122. In various different media activities, using the user interface 120, a user may experience and manipulate media content in various different ways, or may experience and manipulate media content of different types or various combinations.

As shown in FIG. 1, the media application framework 160 may be coupled with the one or more sensors 150 for integrating at least the portion of the media content 112 into the operation of at least one of the plurality of media activities 122, upon recognizing the media content 112 and at least one of the media activities 122. The media application framework 160 may also include or be coupled to control logic 140. The control logic can be coupled to the one or more sensors 150. Further, the control logic 140 may be coupled with the one or more sensors 150 for media content recognition (using a media content recognition component 142), media activity recognition (using a media activity recognition component 144) or media content integration (using a media content integration component 146). In particular, the control logic 140 may be coupled with the one or more sensors 150 for integrating at least a portion of the media content 112 into the operation of the media activity 122, upon recognizing the media activity 122 and the media content 112.

In discussions of the control logic 140, as well as discussions of any other logic herein, it should be understood that "logic", includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like an application specific integrated circuit (ASIC), a programmed logic device, a memory device containing instructions (e.g., program code), or the like. Logic may include one or more gates, combinations of gates, or other circuit components. Logic may also be fully embodied as software or software components. Where multiple logical logics are described, it may be possible to incorporate the multiple logical logics into one physical logic.

Figure 2:
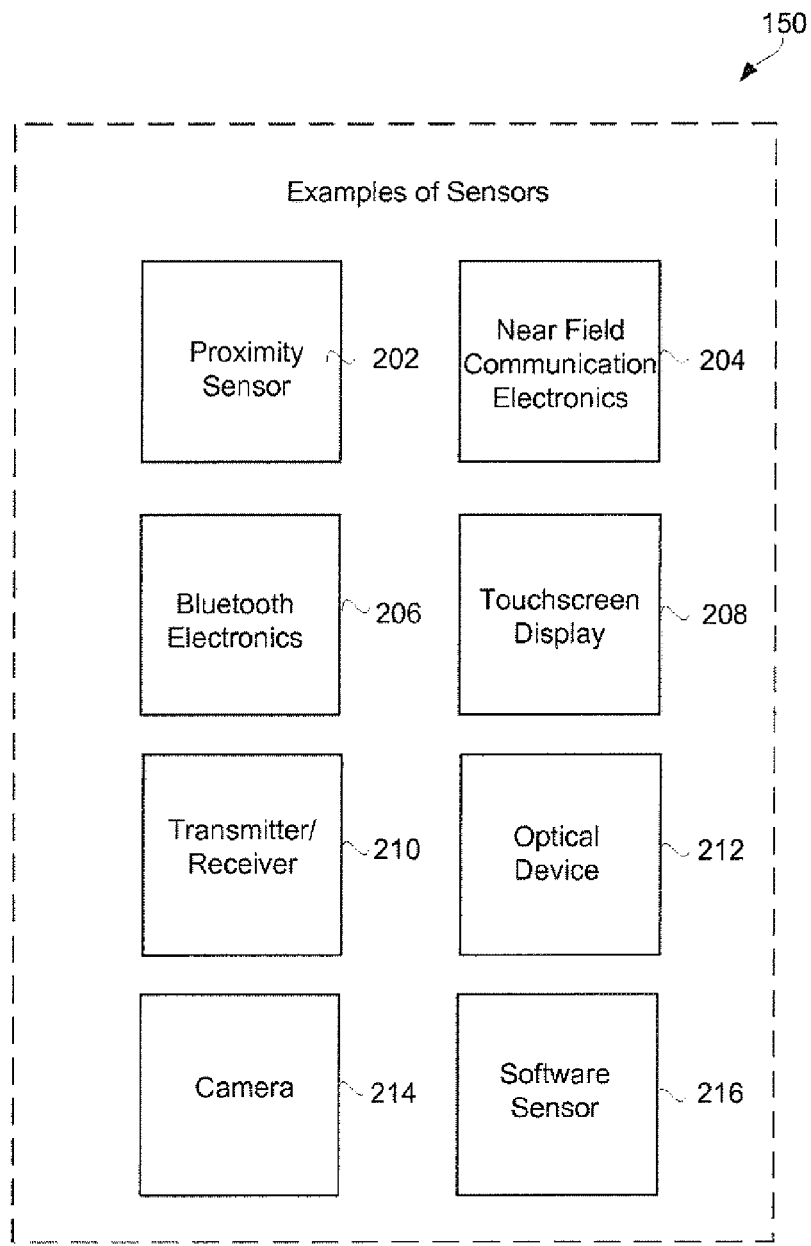
FIG. 2 illustrates a block diagram of several examples of sensors, according to one embodiment.

FIG. 2 illustrates a block diagram of several examples of sensors 150, according to one embodiment. The sensors 150 may comprise one or more of a proximity sensor 202, near field communication electronics 204, short range wireless (Bluetooth™) electronics 206, or an optical device 212. Additionally, the sensors 150 may comprise a camera 214 such as a webcam, a digital camera or a digital video camera, and may comprise a touch screen display 208, or a transmitter and/or receiver 210.

The sensors 150 may comprise a software sensor 216 for sensing the media content 112 of the handheld carrier 110. The handheld carrier 110 may have an active window that highlights particular media content (e.g., a photograph from a photograph library or a photograph that was taken by a camera or camera functionality of the handheld carrier 110). One or more of the software sensors 216 may sense particular or highlighted media content of the handheld carrier 110, or may sense an active window having media content.

Further, the sensors 150 may comprise a software sensor for sensing the media activity, or an active display window of the media activity. For example, an editing software sensor may be employed for sensing a media editing activity. An editing software sensor may be for sensing electronic document editing activity, or for sensing where the media content is to be inserted in an electronic document. One or more of any of the foregoing software sensors may sense commands or machine state, or may be of a trap type for manipulating data and making operations on known variables.

Figure 3:
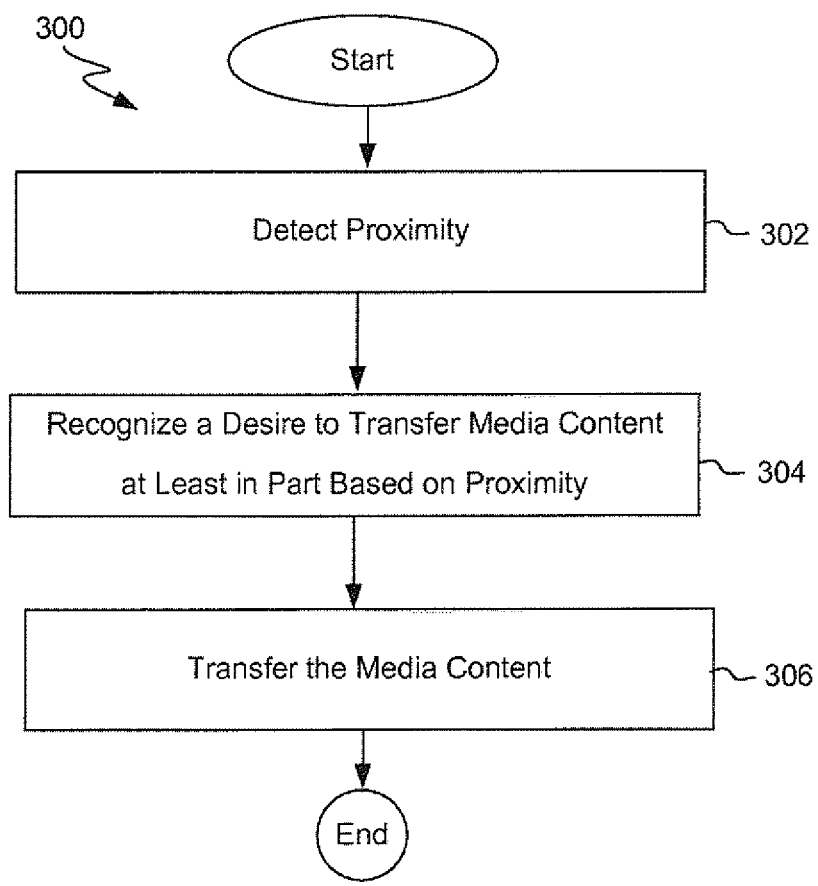
FIG. 3 is a flow diagram of a process for transferring media content from a first device to a second device, according to one embodiment.

FIG. 3 is a flow diagram of a process 300 for transferring media content from a first device to a second device, according to one embodiment. The first device may be hosting media content. For example, the first device may comprise a handheld carrier hosting media content. The second device may be a media content receiving device. The second device may be a computing device (e.g., personal computer) including one or more media applications that provide media activities designed to receive media content.

The first device may have an active window that identifies (e.g., highlights) a particular media content (e.g., photograph from photograph library or photograph that was taken by a camera or camera functionality) on the first device. The second device may at this time have a particular media activity, an active media application, an active window or active electronic document that is capable of receiving media content. For example, the second device may present a word processor window, a design application window, an e-mail window, a web page window, or a photograph application window.

The process 300 may detect proximity of the first device relative to the second device (302). This may include detecting the proximity of the first device (or proximity of the media content) relative to the media activity, the active media application, the active window, or the active electronic document of the second device.

The process 300 may then recognize a desire to transfer media content from the first device to the second device at least in part based on proximity of the two devices (304). In addition to recognizing proximity, the process 300 may include recognizing the active window that highlights the particular media content of the first device, and/or may include recognizing an active window or active electronic document at the second device. The foregoing may include recognizing that such proximity is associated with a transfer event, i.e., the desire to transfer the media content from the first device to the second device (or to media activity, active media application, active window, or active electronic document of the second device). A transmission handshake (e.g., a wireless transmission handshake) may be initiated between the first and second devices, upon recognizing the desire to transfer media content.

The process 300 may continue with transferring the media content from the first device to the second device (306). For example, if the transfer event is recognized (Le., one or more windows are active), the highlighted media content from the first device can be transferred to the second device. The media content may be transferred according to the location of the first device relative to the media activity (e.g., relative to the active media application, the active window, or the active electronic document) of the second device. For example, the media content may be transferred and placed or displayed where the first device is located relative to the active window, locations within the active window, or features of the active window. The media content may be transferred using wireless communication electronics. For example, near field communication electronics or short-range wireless (e.g., Bluetooth™) communication electronics may be used. Following the transfer (306) of the media content, the process 300 can end, though the process 300 can repeat or be reactivated as appropriate.

Figure 4:
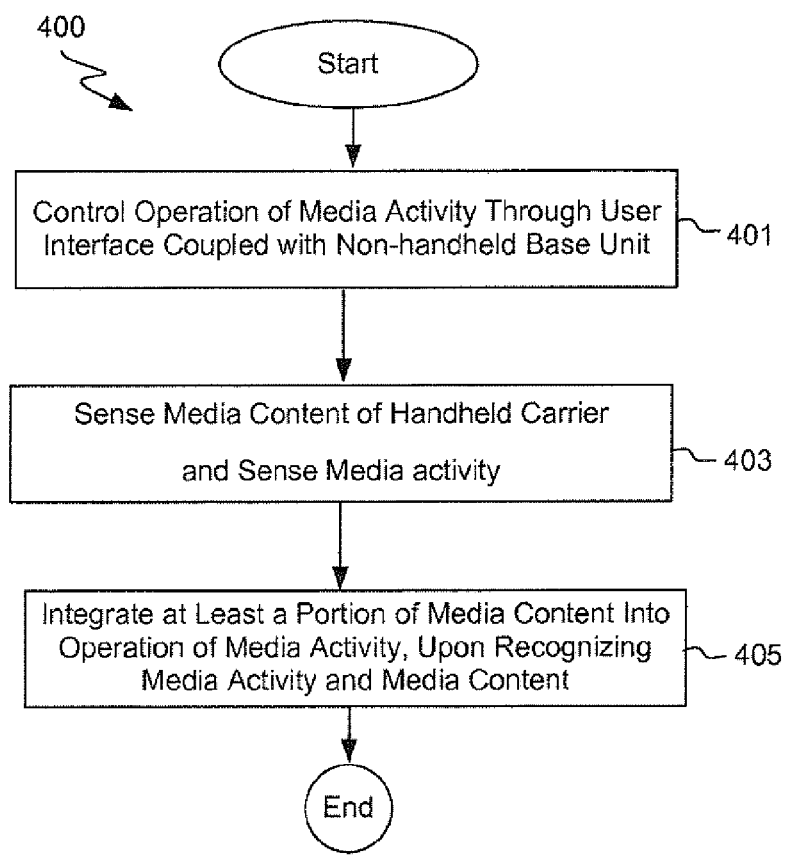
FIG. 4 is a flow diagram of a process for interacting with a handheld carrier hosting media content, according to one embodiment.

FIG. 4 is a flow diagram of a process 400 for interacting with a handheld carrier hosting media content, according to one embodiment. The process 400 may begin with controlling operation of a media activity through a user interface coupled with a non-handheld base unit (401). The process 400 may continue with sensing the media content of the handheld carrier and sensing the media activity at the handheld base unit (403). The process 400 may continue with integrating at least a portion of the media content into the operation of the media activity, upon recognizing the media activity and the media content (405). Thereafter, the process 400 can end, though the process 400 can repeat or be reactivated as appropriate.

According to one embodiment, an electronic image resident on a portable electronic device can be transferred and inserted into an existing electronic document in use on a computing device. With the computing device having a display screen, the electronic image can be easily inserted into the electronic document without having to undergo a synchronization operation and with only minimal user interaction required.

Figure 5:
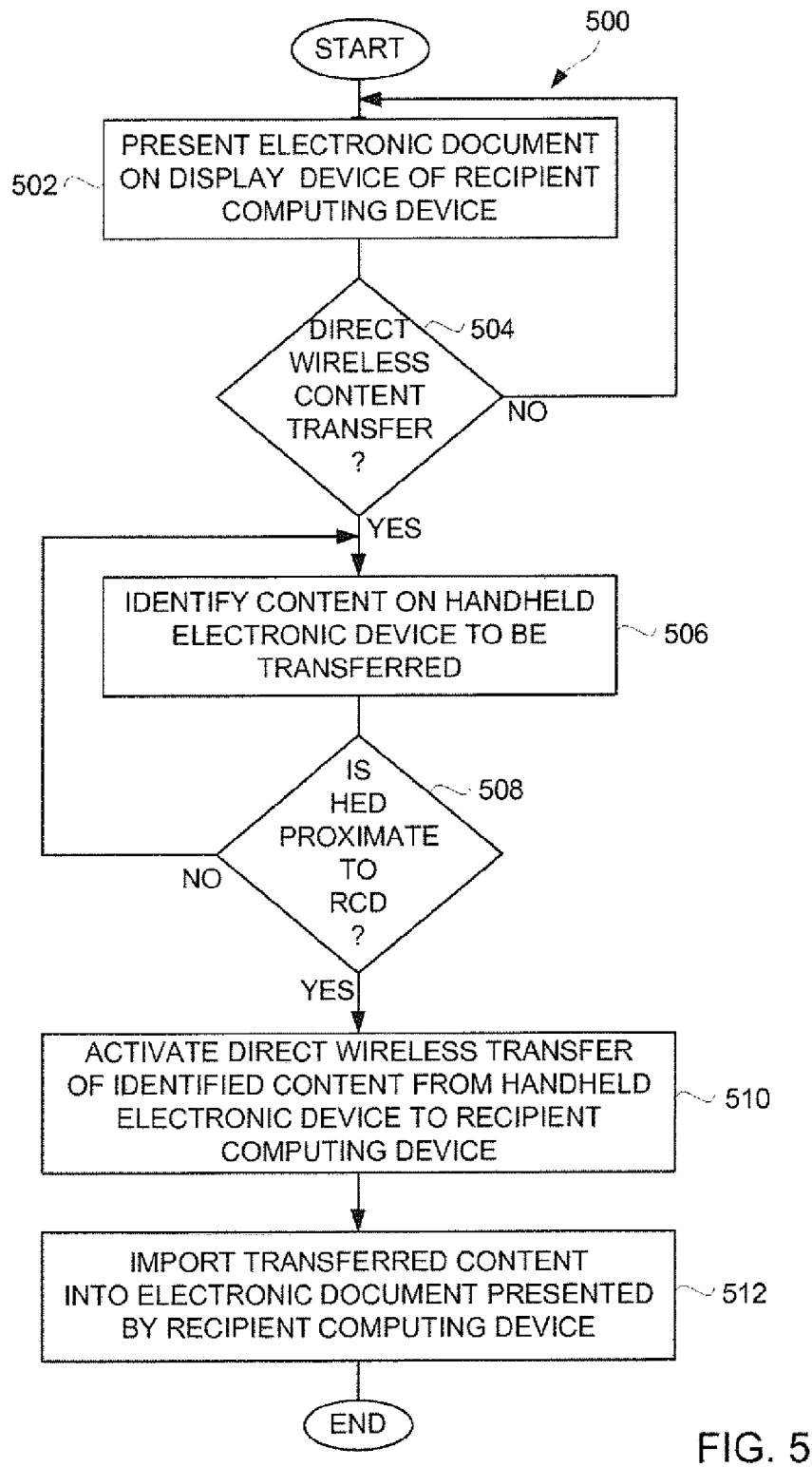
FIG. 5 is a flow diagram of a wireless import process according to one embodiment.

FIG. 5 is a flow diagram of a wireless import process 500 according to one embodiment. The wireless import process 500 can be performed by a computing device, namely, a recipient computing device, such as a non-handheld base unit. Examples of recipient computing devices include a desktop personal computer and a portable computer (e.g., notebook computer or netbook computer). The non-handheld base unit discussed above can also be considered a computing device.

The wireless import process 500 can present 502 an electronic document on a display device of a recipient computing device. Thereafter, a decision 504 can determine whether content transfer is to be performed. The direct wireless content transfer is wireless data transfer from a handheld electronic device to the recipient computing device. Here, the content transfer is for particularly identified content and is in contrast to a general synchronization operation which provides content transfer. When the decision 504 determines direct wireless content transfer is not to be performed, the wireless import process 500 can return to repeat the block 502 and subsequent blocks.

On the other hand, when the decision 504 determines that direct wireless content transfer is to be performed, content on a handheld electronic device that is to be transferred is identified. In one implementation, the content to be transferred can be identified by being displayed on a display device of the handheld electronic device.

A decision 508 can then determine whether the handheld electronic device is proximate to the recipient computing device. In one embodiment, "proximate" can indicate a very close relationship between the devices such as on the order of less than or equal to about thirty (30) centimeters. In another embodiment, "proximate" can indicate a near touch relationship such as on the order of less than or equal to about six (6) centimeters. In still another embodiment, "proximate" can indicate a touch relationship (i.e., a physical touch, even if only momentary). When the decision 508 determines that the handheld electronic device is not proximate to the recipient computing device, the wireless import process 500 can return to repeat the block 506 and subsequent blocks.

However, when the decision 508 determines that the handheld electronic device is proximate to the recipient computing device, direct wireless transfer of the identified content from the handheld electronic device to the recipient computing device can be activated 510. In one embodiment, the activation 510 can be automatic (i.e., without additional user input) once in the handheld electronic device has become proximate with respect to any recipient computing device. For example, a user of the handheld electronic device can bring the handheld electronic device proximate to the recipient computing device. After the direct wireless transfer of the identified content, the transferred content can be imported 512 into the electronic document being presented by the recipient computing device. For example, the electronic document can be presented in a window on the display device of the recipient computing device. The transferred content can be imported directly into new electronic document and also be displayed in the window on the display device of the recipient computing device. In one embodiment, once transfer has been activated, importation of the transferred content can be performed without further user input. Following the block 512, the wireless import process 500 can end.

Figure 6:
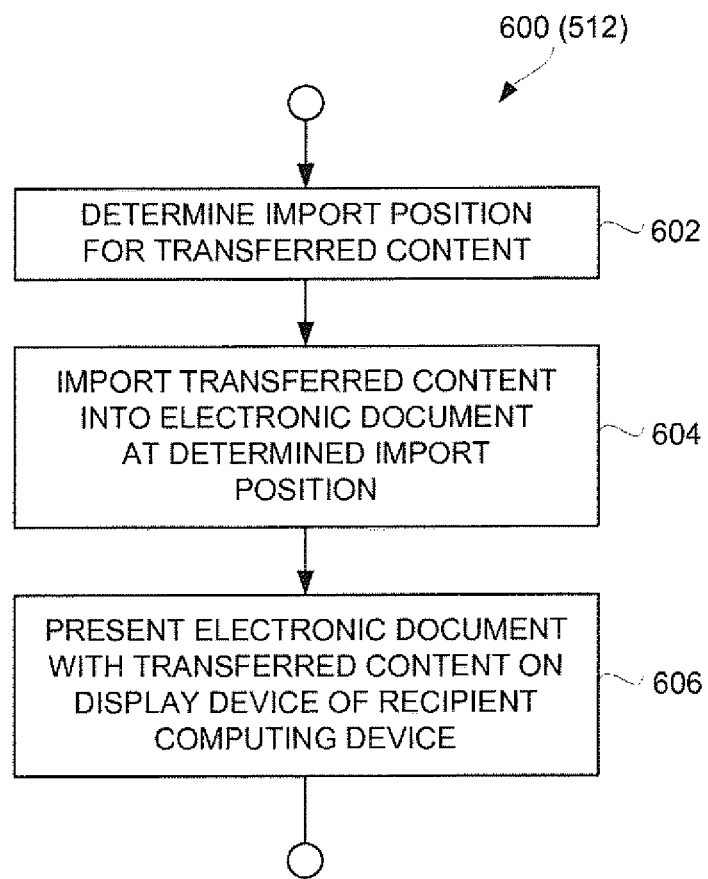
FIG. 6 is a flow diagram of an import process according to one embodiment.

FIG. 6 is a flow diagram of an import process 600 according to one embodiment. The import process 600 can, for example, pertain to processing associated with block 512 illustrated in FIG. 5. The import process 600 can determine 602 an import position for the transferred content. The import position can represent the position (or location) within the electronic document where the transferred content is to be placed. For example, if the electronic document is provided in a window presented on the display device, the import position can be associated with a particular position with respect to the window such that the transferred content can be placed in the particular position with respect to the electronic document. After the import position has been determined 602, the transferred content can be imported 604 into the electronic document at the determined import position. Once the transferred content has been imported 604, the electronic document can be presented 606 with the transferred content on the display device of the recipient computing device.

According to another embodiment, a hand-drawn diagram can be inserted into an existing electronic document in use on a computing device. With the computing device having a display screen and a camera, the hand-drawn diagram can be easily inserted into the electronic document without having to utilize an electronic scanner and with only minimal user interaction required.

Figure 7:
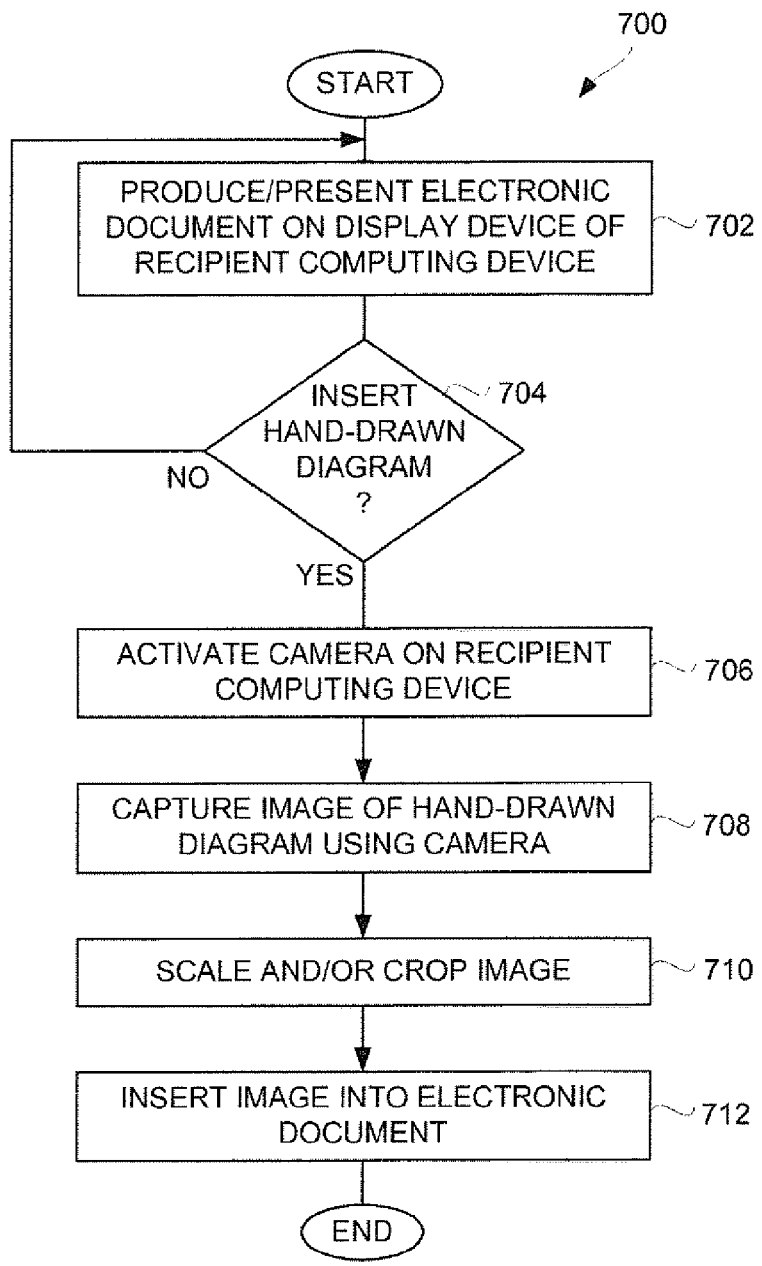
FIG. 7 is a flow diagram of an insertion process according to one embodiment.

FIG. 7 is a flow diagram of an insertion process 700 according to one embodiment. The insertion process 700 can be performed by a computing device, namely, a recipient computing device. Examples of recipient computing devices include a desktop personal computer and a portable computer (e.g., notebook computer or netbook computer). The non-handheld base unit discussed above can also be considered a computing device.

The insertion process 700 can begin by producing and/or presenting 702 an electronic document on a display device of a recipient computing device. For example, the recipient computing device can pertain to a personal computer that includes or couples to a display device. The display device can present the electronic document for which a user of the recipient computing device is utilizing. The electronic document being presented 702 can have been produced using the recipient computing device or can have been made elsewhere but obtained and presented 702 on the display device.

In accordance with the insertion process 700, the intention of the user of the recipient computing device is to insert a hand-drawn diagram into the electronic document being presented 702 of the display device. Before, during or after presenting 702 the electronic document, a hand-drawn diagram is made available to the user of the recipient computing device. For example, the hand-drawn diagram can be produced using manual drafting techniques by an individual, such as the user, onto a paper or plastic product.

Once the electronic document is presented 702 on the display device and a hand-drawn diagram is available, a decision 704 can determine whether the hand-drawn diagram is to be inserted into the electronic document. Typically, the user of the recipient computing device will interact with the recipient computing device to request insertion of a hand-drawn diagram. For example, a user can interact with a graphical user interface to request insertion of a hand-drawn drawing, such as with a menu selection provided using a pointing device (e.g., mouse, touchscreen). When the decision 704 determines that insertion of a hand-drawn diagram has not yet been requested, the insertion process 700 can return to repeat block 702.

On the other hand, once the decision 704 determines that insertion of a hand-drawn diagram has been requested, a camera of the recipient computing device can be activated 706. As one example, the recipient computing device can pertain to a personal computer that includes a display device having a camera integral or mounted proximate thereto. In another example, the recipient computing device can pertain to a personal computer that includes a camera that pertains to a peripheral device that can be removeably connected or coupled to the recipient computing device.

After the camera has been activated 706, an image of the hand-drawn diagram is captured 708 using the camera. Here, the user of the recipient computing device can position the hand-drawn diagram proximate to the camera so that the camera can capture 708 the image of the hand-drawn diagram. Depending upon the implementation, the hand-drawn diagram and/or the camera can be positioned so that the image of the hand-drawn diagram can be properly captured. In addition, the image that has been captured 708 can be scaled and/or cropped 712. Typically, it will be desired that the captured image have an appropriate scale and/or be appropriately cropped for placement within the electronic document. Hence, these processing operations for the image being inserted can be automatically performed once the image of the hand-drawn diagram has been captured 710. The user of the recipient computing device can also assist with scaling and/or cropping operations by identifying a bounding box or the portion of the paper that is to represent the image being inserted. Thereafter, the image can be inserted 712 into the electronic document. The placement of the image into the electronic document can be controlled in advance by the user of the recipient computing device, such as when requesting the insertion of the hand-drawn diagram. For example, a pointing device can be used to designate the insertion point. Following to block 712, the insertion process 700 can end.

Figure 8:
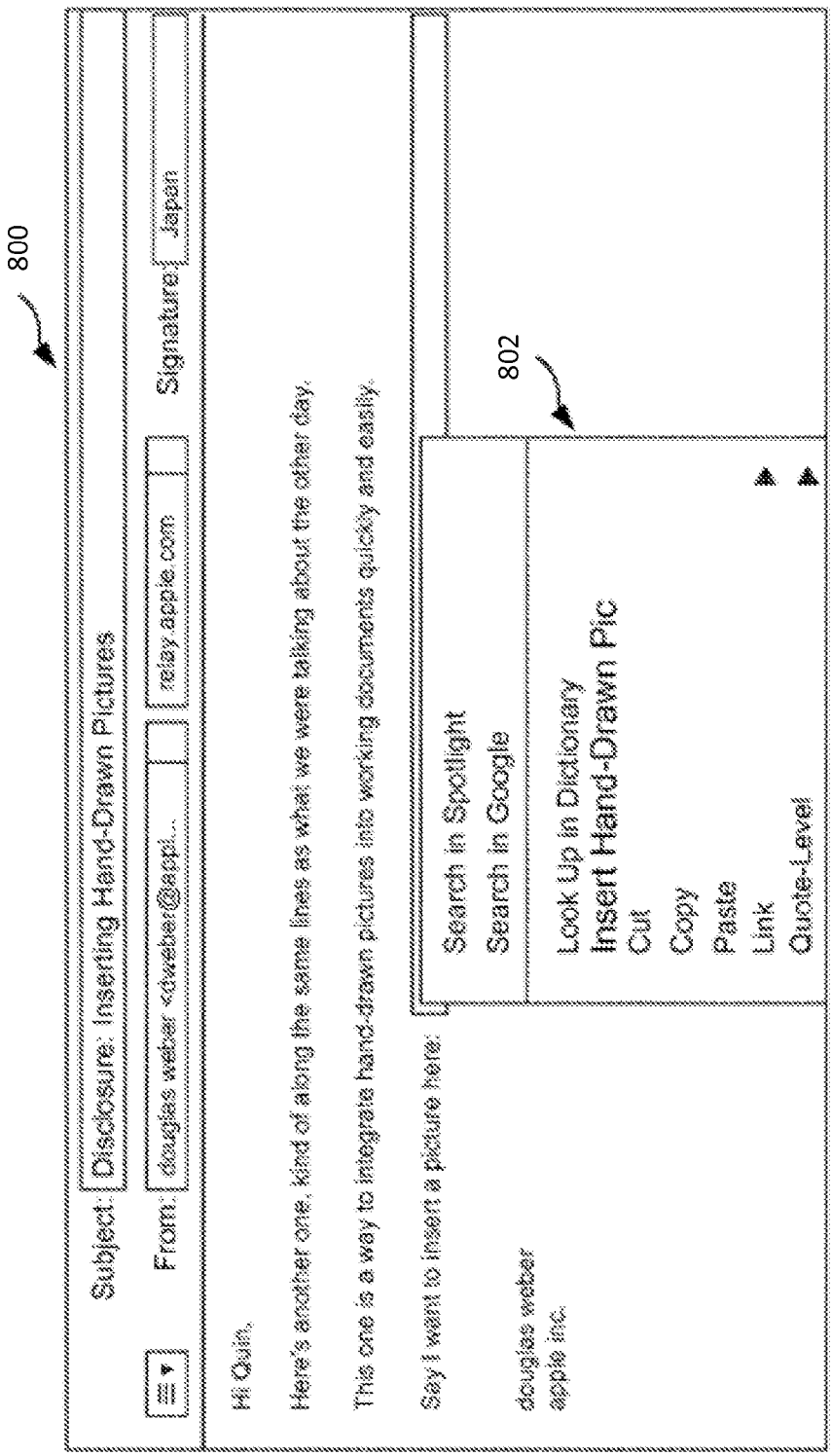
FIG. 8 is an exemplary screenshot display of a user interface controlling a media activity, according to one embodiment.

FIG. 8 is an exemplary screenshot display of a user interface 800 controlling a media activity, according to one embodiment. The user interface 800 may be a screen presented on a display device, such as a display device of a recipient computing device. The user interface 800 can display media activity in an active display window. In one embodiment, the user interface 800 can comprise an electronic document editing interface for controlling operation of an electronic document editing activity. For example, an electronic document (e.g., email message) may be edited as shown in FIG. 8. Specifically, with reference to the example provided in FIG. 8, a mouse (or other pointing device) may be employed by a user to position a cursor at a desired location. Media content, for example, a hand-drawn picture, may be inserted into the electronic document at the desired location. A mouse click (or suitable selection method) may be employed by a user, and a selectable menu option, for example, "Insert Hand-Drawn Pic", of a pop-up menu 802 may be displayed adjacent to the desired location. Such menu selections, as well as other machine state aspects of the media activity may be sensed by one or more software sensors.

In response to one or more software sensors and the media activity, the media activity recognition component 144 of the control logic 140 may perceive the media activity (or may perceive an active display window providing the media activity). In particular, in response to an editing software sensor and the media activity, the media activity recognition component 144 of the control logic 140 may perceive a media editing activity (or may perceive an electronic document editing activity, and/or may perceive where the media content is to be inserted into an electronic document). In perceiving and/or recognizing the media activity, the media activity recognition component 144 may (i) receive sensor data from one or more the software sensors; (ii) may compare such sensor data to stored data; and (iii) may match such sensor data to particular stored data, which is indicative of a particular media activity.

Figure 9:
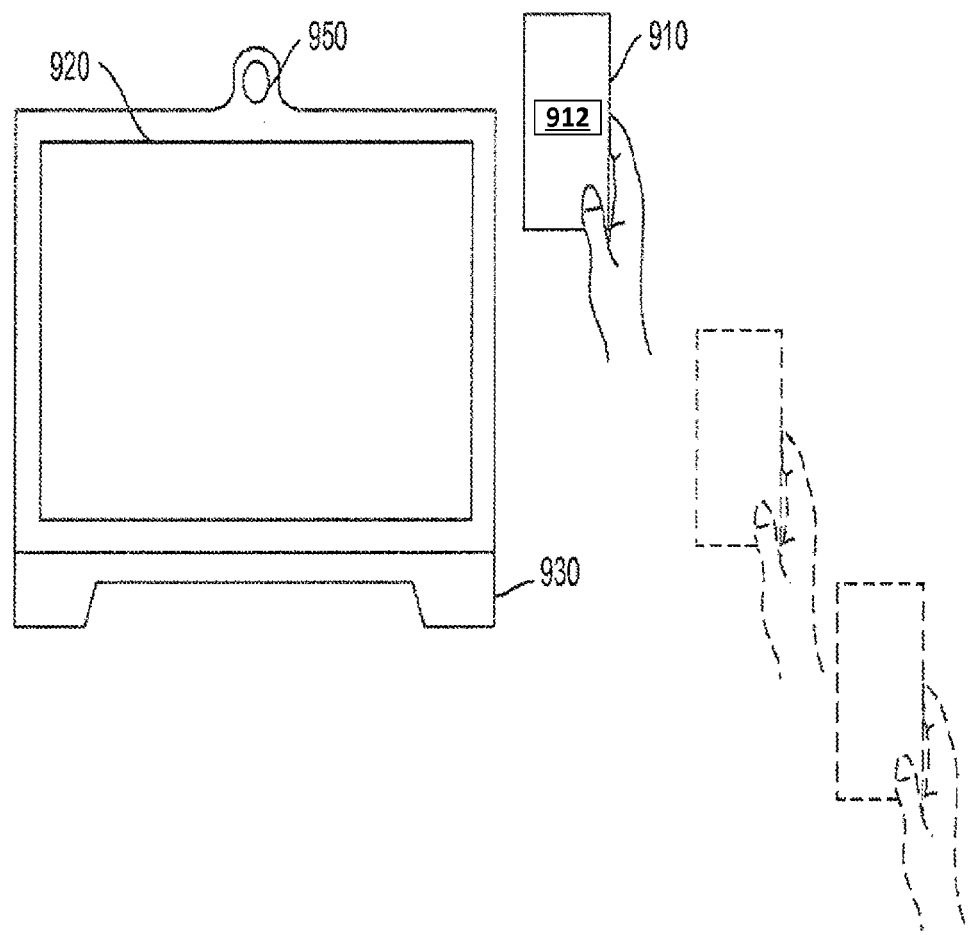
FIG. 9 illustrates a simplified diagram of sensing a handheld carrier hosting media content with a non-handheld base unit, according to one embodiment.

FIG. 9 illustrates a simplified diagram of sensing a handheld carrier 910 hosting media content with a non-handheld base unit 930, according to one embodiment. The non-handheld base unit 930 can include a display device 920 that may exhibit a user interface for controlling a media activity. Additionally, the handheld carrier 910 can, in one embodiment, comprise a handheld multifunction electronic device capable of playing/displaying one or more of images (e.g., photos), text, audio items (e.g., audio files, including music or songs), and videos (e.g., movies) in digital form.

The non-handheld base unit 930 can also include at least one sensor 950. The at least one sensor 950 may sense the media content of the handheld carrier and/or the media activity. The at least one sensor may comprise at least one of a software sensor, a proximity sensor, near field communication electronics, short-range wireless (e.g., Bluetooth™) electronics, an optical device, a camera (such as a webcam, a digital camera or a digital video camera), a touchscreen display, or a transmitter and/or receiver.

Although the at least one sensor 950 are shown in FIG. 9 as remote from the handheld carrier 910 and integral with the non-handheld base unit 930, it should be understood that arrangement of the at least one sensor 950 is not necessarily limited to the arrangement specifically shown in FIG. 9. For example, since the handheld carrier 910 may comprise the handheld multifunction electronic device, one or more sensors (or portions thereof) may be disposed on or in the handheld carrier 910.

As shown in FIG. 9, the handheld carrier 910 may be moveable to alternative positions relative to the non-handheld base unit 930. A proximate position of the handheld carrier 910 hosting media content is depicted in solid line in FIG. 9. Alternative distal positions of the handheld carrier 910 hosting media content 912 are depicted in dashed line in FIG. 9.

The handheld carrier 910 may be moved by a user through alternative positions, from the distal positions to the proximate position, the handheld carrier 910 may cross a preselected proximity threshold and thereby become "proximate" with the non-handheld base unit 930. As an example, the media content recognition component 142 of the control logic 140 can perform the proximity detection. The user interface (e.g., audio, visual or physical) may comprise a notification for notifying the user, upon the handheld carrier 910 crossing the proximity threshold. The user interface may comprise a notification for notifying the user, upon the control logic 140 integrating the media content into the operation of the media activity.

The handheld carrier 910 can also provide a user interface. The user interface can, for example, display media content on a display device of the handheld carrier. The user interface may also comprise a haptic notification for notifying the user of the handheld carrier 910. More particularly, since the handheld carrier 910 may pertain to a handheld multifunction electronic device, a haptic device may be disposed in or on the handheld carrier 910. The haptic device may be in operative communication with, and activated so that the user's hand (shown holding the carrier 910 in FIG. 9) feels a physical sensation from the haptic notification.

The least one sensor 950 may comprise a proximity sensor for sensing proximity of the handheld carrier 910 hosting media content relative to the non-handheld base unit 930. Similarly, the proximate position of the handheld carrier 910 may be proximate relative to the display device 920. Accordingly, the at least one sensor 950 may comprise a proximity sensor for sensing proximity of the handheld carrier 910 hosting media content to the non-handheld base unit 930 or the display device 920. Similarly, it should be understood that although the proximity sensor 950 may be broadly referenced herein, wherein proximity may be particularly sensed by one or more of near field communication electronics, short-range wireless (e.g., Bluetooth™) electronics, an optical device, a camera (such as a webcam, a digital camera or a digital video camera), a touchscreen display, or a transmitter and/or receiver. Notwithstanding the foregoing description of functionality for sensing proximity, it should be understood the foregoing proximity sensing techniques may also be used for conveying or transferring data (including media content).

In response to the at least one sensor 950 and the proximate position of the handheld carrier 910, the media content recognition component 142 of the control logic 140 may perceive the handheld carrier 910 (and thus the media content itself) as proximate relative to the non-handheld base unit 930 (or the display device 920). The control logic 140 may be coupled with the at least one sensor 950 for operating to integrate at least a portion of the media content 912 into the operation of the media activity at the non-handheld base unit 930. Upon recognizing the media activity and proximity of the media content 912 (or the handheld carrier 910 hosting media content), at least a portion of the media content 912 can be transferred from the handheld carrier 910 to the non-handheld base unit 930 and then integrated into the media activity provided at the non-handheld base unit 930. For example, the control logic 140 may be coupled with the at least one sensor 950 for inserting the media content into an electronic document, upon recognizing an electronic document editing activity for the electronic document and proximity of the handheld carrier 910 hosting media content.

In response to sensing the media content of the handheld carrier 910, such as via one or more software sensors, the media content recognition component 142 of the control logic 140 may recognize the media content of the handheld carrier 910. The one or more software sensors may sense particular or highlighted media content of the handheld carrier 910, and/or may sense an active window of media content. With the assistance of the one or more such software sensors, the media content recognition component 142 of the control logic 140 may recognize the particular or highlighted media content of the handheld carrier 910, or may recognize the active window of the media content. In recognizing the media content, the media content recognition component 142 may receive data from one or more the software sensors; may compare such sensor data to stored data; and may match such sensor data to particular stored data, which is indicative of the particular or highlighted media content or the active window of the media content.

Although the handheld carrier 910 may comprise a handheld multifunction electronic device, it should be understood that the handheld carrier 910 hosting media content may comprise a physical document having a surface visually depicting media content, such as text or graphics (for example, a hand drawn picture or other text or graphics on the surface of the document). As mentioned previously, the at least one sensor 950 may be a camera (such as a webcam, a digital camera or a digital video camera). The at least one sensor 950 may sense such visual depiction on the surface of the handheld carrier 910, and capture such visual depiction in digital image form. Here, as shown in FIG. 9, the user may position the handheld carrier 910 so that a surface visually depicting its media content is in view of the at least one sensor 950. To assist with the capture of the visual depiction in a digital image form, a box may be drawn around a portion of the media content (e.g., a particular hand drawn picture or other text or graphics) so that such portion may be disposed within the box. When the media content is thereafter captured in digital form by the at least one sensor 950, a digital representation of the box may be used by the media content recognition component 142 of the control logic 140 to recognize a portion of media content (or digital representation) disposed within the digital representation of the box. In particular, the media recognition component 142 may use the digital representation of the box for cropping the portion of the medial content (or digital representation), for more clearly perceiving the portion of the media content (or digital representation). Further, the media recognition component 142 may include handwriting recognition software, for recognizing handwritten text of the media content.

Figure 10:
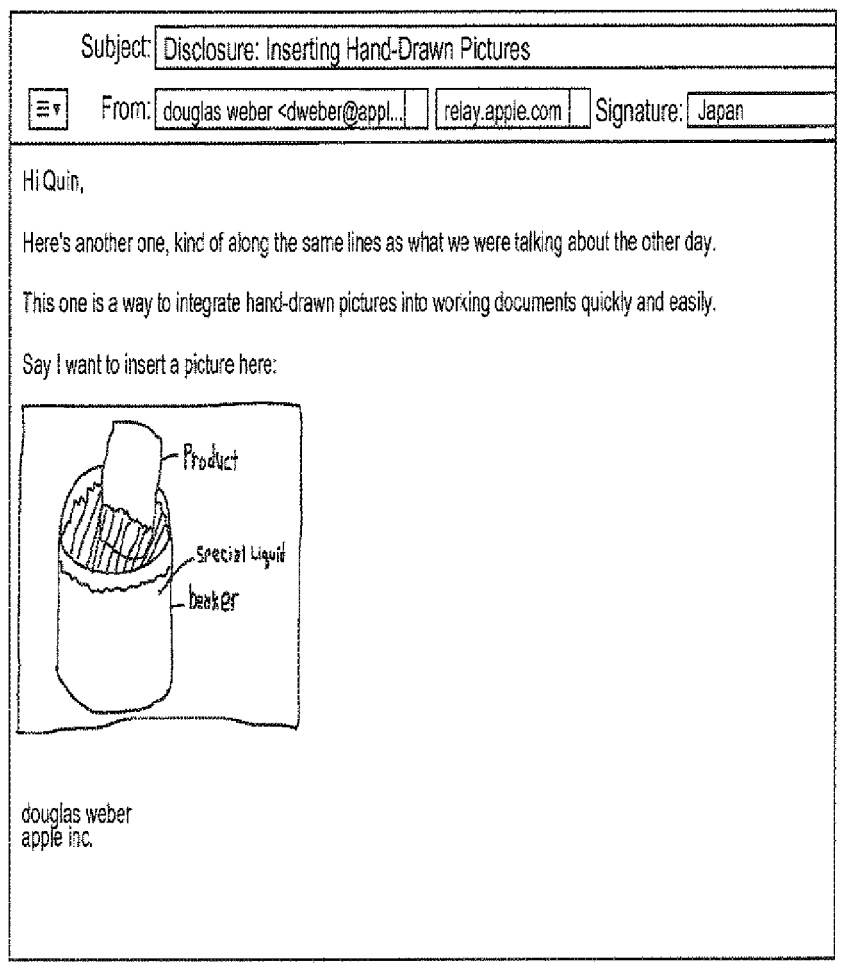
FIG. 10 is an exemplary screenshot display illustrating integration of at least a portion of media content into operation of a media activity, upon recognizing the media activity and the media content, according to one embodiment.

FIG. 10 is an exemplary screenshot display illustrating integration of at least a portion of media content into operation of a media activity, upon recognizing the media activity and the media content, according to one embodiment. The integration can be controlled by control logic, such as the control logic 140 noted above. The media content integration component 142 of the control logic 140 may be coupled with a display device for visually integrating the media content into the operation of the media activity. Further, the media content integration component 142 of the control logic 140 may integrate at least the portion of the media content into operation of the media activity in an active display window.

Graphical user interface controls for adjusting contrast or scale (such as a "contrast bar" or "scale bar", not shown in FIG. 10) may be used to adjust visual contrast or scale of the portion of the media content shown in FIG. 10, for more clearly perceiving the media content and/or for scaling the media content to the media activity. Similarly, contrast and/or scale adjustment may be done automatically by the media content recognition component 142 (e.g., using a preselected contrast level and/or preselected or scaling factors for a preselected output size). The media content recognition component 142 may also correct any mirror image effect, which may be introduced when capturing the media content.

With reference to the screenshot of FIG. 10, the control logic 140 may be coupled with the at least one sensor 150 for integrating the media content into operation of a media editing activity, upon recognizing the media editing activity and the media content. In particular, the control logic 140 may insert the media content into an electronic document, upon recognizing an electronic document editing activity and the media content. The control logic 140 may insert the media content into an electronic document, upon recognizing the media content and recognizing where the media content is to be inserted into the electronic document. For example, an e-mail document may be edited as shown in FIG. 10. Media content, for example, a hand-drawn picture, may be inserted into the e-mail document at a desired location. As mentioned previously, a box may be drawn around a portion of the media content such as a particular hand drawn picture, so that such portion may be disposed within the box. As shown in FIG. 10, the media recognition component 142 may use the digital representation of the box for cropping the portion of the medial content (or digital representation), for more clearly perceiving the portion of the media content (or digital representation).

The invention is preferably implemented by hardware, software, or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The advantages of the invention are numerous. Different aspects, embodiments or implementations may yield one or more of the following advantages. One advantage of the invention is that interacting with a handheld carrier hosting media may be perceived by a user as convenient, intuitive or user-friendly. Another advantage of the invention may be convenience of automatic recognition of media content. Another advantage of the invention may be convenience of automatic recognition of media content that is in proximity. Still another advantage of the invention may be convenience of automatic media activity recognition and/or automatic media content integration. Yet still another advantage of the invention is that data transfer can be activated and performed from a handheld carrier to an electronic device (e.g., computing device) when the handheld carrier is proximate to the electronic device.

The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A non-transitory computer-readable medium storing program code that, when executed by a processor of a recipient computing device, causes the recipient computing device to:
    present an electronic document comprising an active media window on a display device associated with the recipient computing device;
    control an editing operation of the electronic document;
    detect that a handheld electronic device is proximate to the active media window presented on the display device associated with the recipient computing device;
    receive, via a direct wireless transfer from the handheld electronic device, identified content that is selected by highlighting on the handheld electronic device a portion of media content displayed on the handheld electronic device, when the handheld electronic device is detected proximate to the active media window presented on the display device; and
    upon recognizing the identified content and an import position for the identified content, insert the identified content at the recognized import position, wherein the import position represents a position, location, or area within the electronic document at which to insert the identified content.

2. The non-transitory computer-readable medium as recited in claim 1, wherein the display device comprises a touch screen.

3. The non-transitory computer-readable medium as recited in claim 1, wherein the identified content comprises an image.

4. The non-transitory computer-readable medium as recited in claim 1, wherein the recipient computing device detects that the handheld electronic device is proximate to the display device associated with the recipient computing device by at least detecting when the handheld electronic device physically contacts the display device associated with the recipient computing device.

5. The non-transitory computer-readable medium as recited in claim 1, wherein the recipient computing device detects that the handheld electronic device is proximate to the display device associated with the recipient computing device by at least detecting when the handheld electronic device is within a predetermined distance of the display device associated with the recipient computing device.

6. The non-transitory computer-readable medium as recited in claim 1, wherein execution of the program code further causes the recipient computing device to capture the identified content that is displayed on the handheld electronic device by the recipient computing device, wherein the identified content is selected by the recipient computing device by encircling a portion of media content that is displayed on the handheld electronic device.

7. The non-transitory computer-readable medium as recited in claim 1, wherein the recipient computing device inserts the identified content into the electronic document is configured to execute without requiring user input after direct wireless transfer of the identified content to the recipient computing device.

8. A method for transferring content between a first electronic device and a second electronic device, the method comprising:
    presenting an electronic document comprising an active media window on a display device associated with the second electronic device;
    controlling an editing operation of the electronic document;
    detecting a proximity of the first electronic device relative to the second electronic device;
    receiving, via a direct wireless transfer from the first electronic device, identified content that is selected by highlighting on the first electronic device a portion of media content displayed on the first electronic device, when the first electronic device is detected proximate to the active media window presented on the display device; and
    upon recognizing the identified content and import position for the identified content, inserting the identified content at the recognized import position, wherein the import position represents a position, location, or area within an electronic document at which to insert the identified content.

9. The method as recited in claim 8, wherein the identified content comprises an image.

10. The method as recited in claim 8, wherein the proximity of the first electronic device relative to the second electronic device is detected via a near field communication (NFC) interface.

11. The method as recited in claim 8, wherein the first electronic device displays a first active media window which highlights a particular media content, and the second electronic device displays a second active media window that includes at least a portion of the electronic document.

12. The method as recited in claim 11, wherein detecting the proximity of the first electronic device to the second electronic device comprises detecting proximity of the first electronic device relative to the second active media window displayed on the second electronic device.

13. The method as recited in claim 11, wherein detecting the proximity of the first electronic device to the second electronic device comprises detecting proximity of the particular media content in the first active media window displayed on the first electronic device relative to the second active media window displayed on the second electronic device.

14. The method as recited in claim 8, further comprising:
    presenting the electronic document on a display associated with the second electronic device before importing the identified content into the electronic document;
    determining the import position for the identified content; and
    displaying the electronic document on the display associated with the second electronic device with the identified content at the determined import position.

15. The method as recited in claim 14, wherein the second electronic device imports the identified content into the electronic document at the determined import position.

16. The method as recited in claim 8, wherein the first electronic device comprises a handheld carrier hosting media content and the second electronic device comprises a non-handheld base unit that includes one or more sensors.

17. The method as recited in claim 16, wherein the second electronic device detects proximity of the first electronic device using the one or more sensors.

18. A computer implemented apparatus comprising:
    at least one sensor configured to sense proximity of a handheld electronic device hosting media content to the computer implemented apparatus;
    one or more processors; and
    a non-transitory computer-readable medium comprising instructions that, when executed by the one or more processors, cause the computer implemented apparatus to:

present an electronic document comprising an active media window on a display device associated with the computer implemented apparatus that is to receive a wireless content transfer;

control an editing operation of the electronic document;

detect that the handheld electronic device is proximate to the active media window presented on the display device associated with the computer implemented apparatus;

receive, via a direct wireless transfer from the handheld electronic device, identified content that is selected by highlighting on the handheld electronic device a portion of media content displayed on the handheld electronic device, when the handheld electronic device is detected proximate to the active media window presented on the display device; and upon recognizing the identified content and an import position for the identified content, insert the identified content at the recognized import position, wherein the import position represents a position, location, or area within the electronic document at which to insert the identified content.

19. The computer implemented apparatus of claim 18, wherein the instructions, when executed by the one or more processors, further cause the computer implemented apparatus to:

capture the identified content that is displayed on the handheld electronic device by the computer implemented apparatus, wherein the identified content is selected by the computer implemented apparatus by encircling a portion of media content that is displayed on the handheld electronic device.

20. The computer implemented apparatus of claim 18, wherein the electronic document comprises an active media window and the computer implemented apparatus detects that the handheld electronic device is proximate to the display device associated with the computer implemented apparatus by detecting proximity of the handheld electronic device relative to the active media window presented on the display device.

\* \* \* \* \*